United States Patent
Gorce

(10) Patent No.: US 11,981,312 B2
(45) Date of Patent: May 14, 2024

(54) METHOD FOR CONTROLLING THE BRAKING OF THE WHEELS OF AN AIRCRAFT, AND ASSOCIATED WHEEL BRAKING CONTROLLER

(71) Applicant: SAFRAN AIRCRAFT ENGINES, Paris (FR)

(72) Inventor: Clément Georges Henri Gorce, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 203 days.

(21) Appl. No.: 17/436,263

(22) PCT Filed: Mar. 13, 2020

(86) PCT No.: PCT/FR2020/050541
§ 371 (c)(1),
(2) Date: Sep. 3, 2021

(87) PCT Pub. No.: WO2020/188206
PCT Pub. Date: Sep. 24, 2020

(65) Prior Publication Data
US 2022/0169216 A1    Jun. 2, 2022

(30) Foreign Application Priority Data

Mar. 21, 2019  (FR) ...................... 1902924

(51) Int. Cl.
*G06F 7/70*      (2006.01)
*B60T 8/17*      (2006.01)
(Continued)

(52) U.S. Cl.
CPC ............ *B60T 8/1703* (2013.01); *B64C 25/34* (2013.01); *B64C 25/426* (2013.01)

(58) Field of Classification Search
CPC ..... B60T 8/1703; B64C 25/34; B64C 25/426; G06F 7/70
(Continued)

(56) References Cited

U.S. PATENT DOCUMENTS 5,505,531 A * 4/1996 Griffith ................. B60T 13/662
                                                    303/20
5,539,642 A * 7/1996 Wiel ....................... B60T 8/174
                                                    706/900
(Continued)

FOREIGN PATENT DOCUMENTS

EP    3251947 A1    12/2017
FR    1546878 A     11/1968

OTHER PUBLICATIONS

International Search Report in International Application No. PCT/FR2020/050541, mailed Jul. 23, 2020, with English translation (5 pages).
(Continued)

*Primary Examiner* — Shardul D Patel
(74) *Attorney, Agent, or Firm* — Bookoff McAndrews, PLLC

(57) ABSTRACT

Method for monitoring the braking of the wheels of an aircraft in which the braking of the wheels of the aircraft is controlled by a wheel braking controller actuating the wheel brakes of the aircraft based on both a deceleration regulation request and a thrust reverser deployment request.

10 Claims, 7 Drawing Sheets

(51) Int. Cl.
*B64C 25/34* (2006.01)
*B64C 25/42* (2006.01)

(58) Field of Classification Search
USPC .......................................................... 701/70
See application file for complete search history.

(56) References Cited

U.S. PATENT DOCUMENTS

| | | | | |
|---|---|---|---|---|
| 2008/0150353 | A1* | 6/2008 | Griffith | B60T 7/12 477/208 |
| 2008/0154445 | A1* | 6/2008 | Goodman | B60T 8/1703 701/3 |
| 2010/0212287 | A1* | 8/2010 | Kubiak | F02K 1/72 60/226.2 |
| 2012/0109424 | A1* | 5/2012 | Fervel | B64C 13/505 701/3 |
| 2013/0116862 | A1* | 5/2013 | Griffith | B60T 7/12 701/3 |
| 2014/0012437 | A1* | 1/2014 | Jones | B60T 8/1703 701/15 |
| 2014/0257603 | A1* | 9/2014 | McKeown | G08G 5/0021 701/16 |
| 2015/0316929 | A1* | 11/2015 | Veronesi | B64C 25/426 701/16 |
| 2016/0047333 | A1* | 2/2016 | Starovic | F02K 1/70 239/265.19 |
| 2017/0341772 | A1* | 11/2017 | Reis | B64C 13/16 |
| 2017/0355470 | A1* | 12/2017 | Keller | F21S 41/657 |
| 2018/0122250 | A1* | 5/2018 | Wapenski | B64C 25/426 |
| 2018/0297567 | A1* | 10/2018 | Gonidec | B60T 8/17616 |
| 2019/0054906 | A1* | 2/2019 | Pedapudi | B64C 25/42 |
| 2020/0189728 | A1* | 6/2020 | Mackin | B64C 25/42 |

OTHER PUBLICATIONS

Written Opinion of the International Searching Authority in International Application No. PCT/FR2020/050541, mailed Jul. 23, 2020, with English translation (9 pages).

* cited by examiner

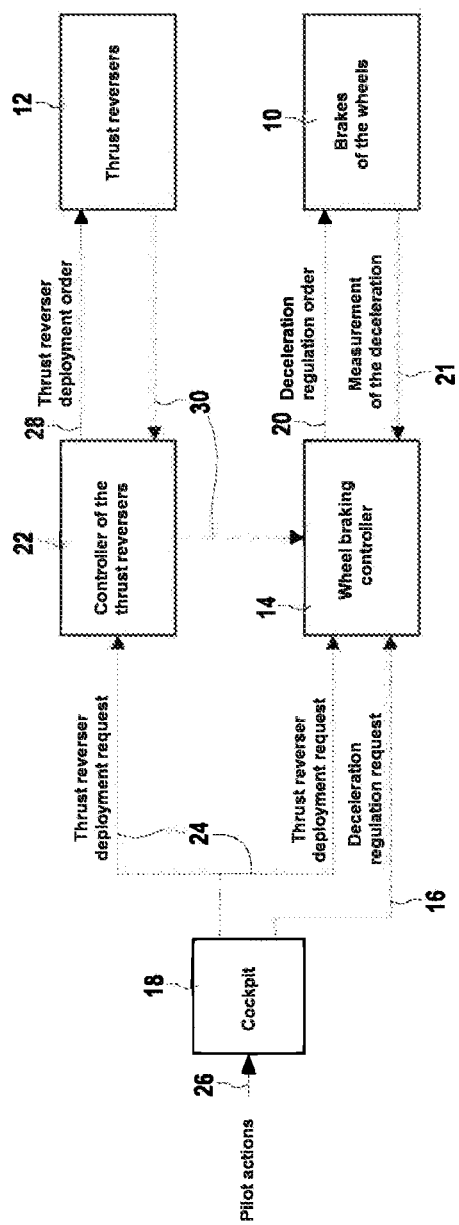
[FIG. 1]

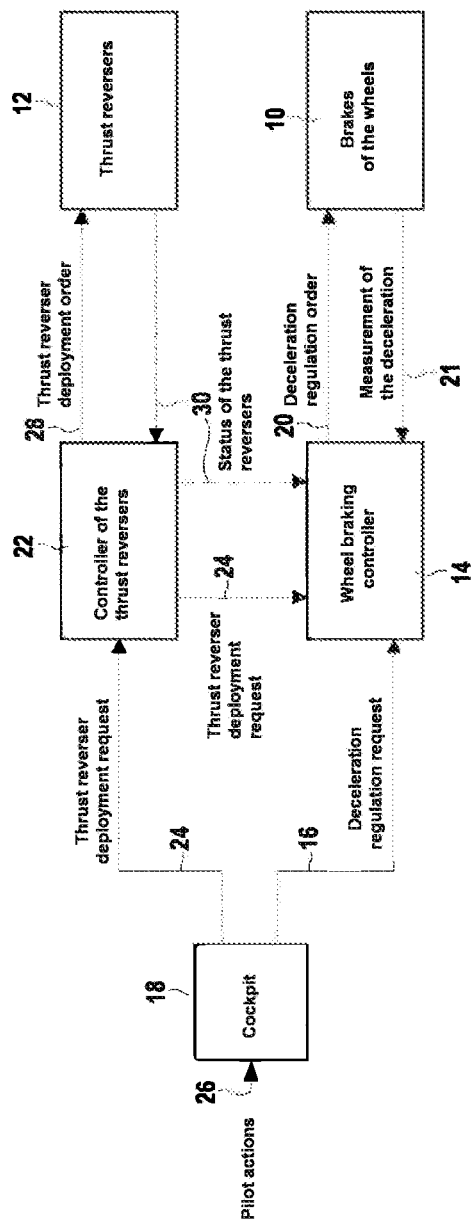
[FIG. 2]

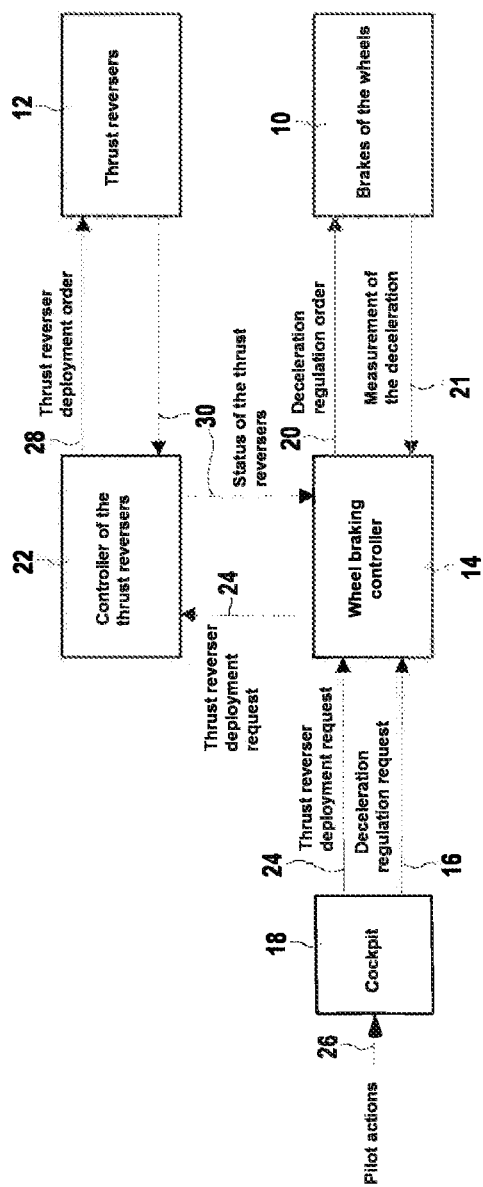
[FIG. 3]

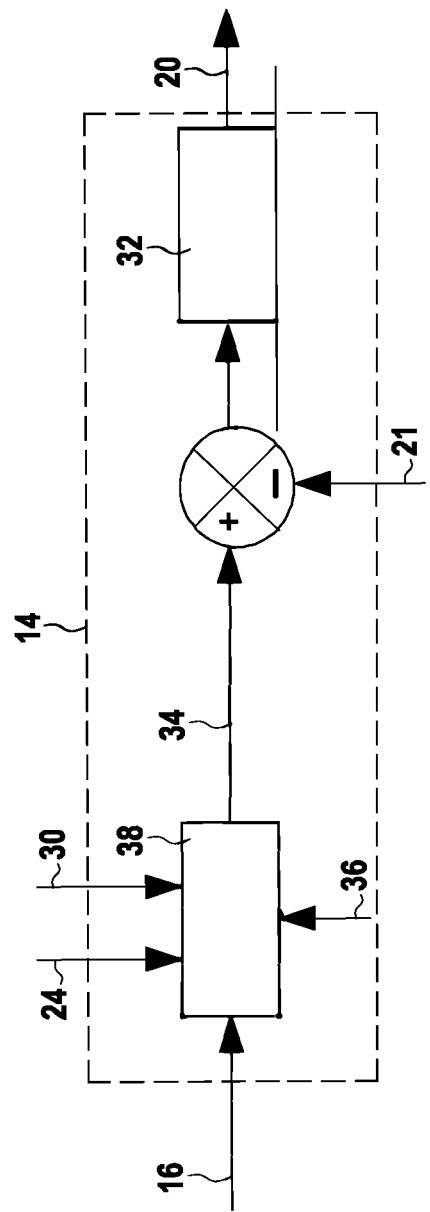

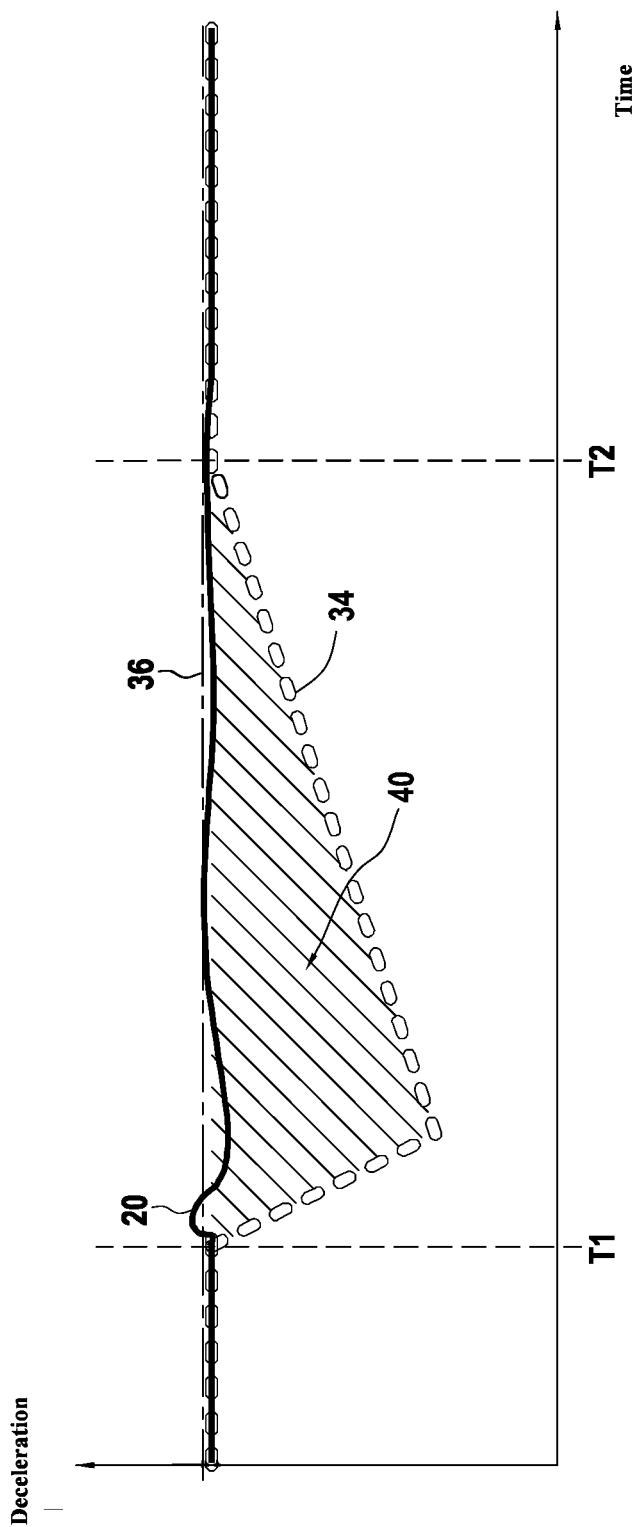
[Fig. 5]

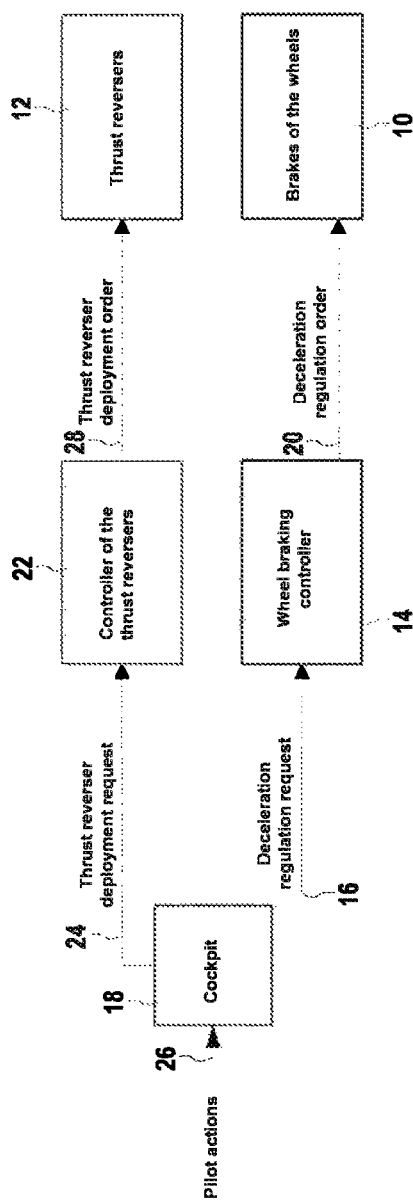
[FIG. 6]

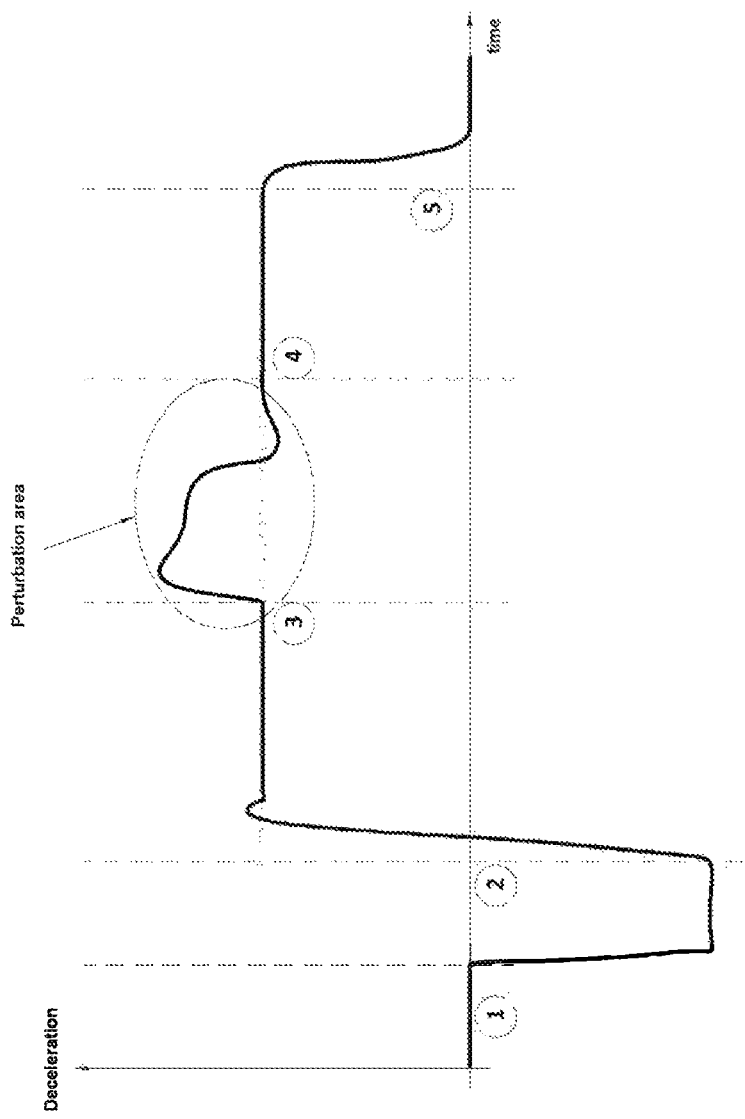
[FIG. 7]

METHOD FOR CONTROLLING THE BRAKING OF THE WHEELS OF AN AIRCRAFT, AND ASSOCIATED WHEEL BRAKING CONTROLLER

CROSS-REFERENCE TO RELATED APPLICATION(S)

This application is the U.S. national phase entry under 35 U.S.C. § 371 of International Application No. PCT/FR2020/050541, filed on Mar. 13, 2020, which claims priority to French Patent Application No. 1902924, filed on Mar. 21, 2019.

TECHNICAL FIELD

The invention relates to the field of aircraft braking and concerns more particularly an improved braking method for aircrafts.

PRIOR ART

On an aircraft, several sources allow braking the aircraft during the landing phase or during an aborted take-off.

As shown in FIG. 6, there are mainly two sources dedicated to this braking function and whose triggering is performed independently of each other from the cockpit on different actions of the pilot: the braking system including the wheel brakes 10 and the thrust reverser system including the thrust reversers 12. The wheel brakes 10 are controlled from a wheel braking controller 14 which receives a deceleration regulation request 16 coming from the cockpit 18 and issues a deceleration regulation order 20 for the wheel brakes 10. The thrust reversers 12 are for their part controlled from a thrust reverser controller 22 which receives a thrust reverser deployment request 24 coming from the cockpit 18 from which the actions of the pilot 26 arrive and issues a thrust reverser deployment order 28 for the thrust reversers 12.

The wheel braking system included in the landing gear of the aircraft is capable of ensuring the aircraft braking function on its own. Indeed, the certification of the braking distances only applies to the wheel braking system, which is the only system taken into account to determine whether an aircraft can land on a particular runway. However, in order to facilitate this certification, the thrust reverser system included in the turbojet engines of the aircraft is very often considered as an option used to reduce the wear of the wheel braking system and this especially as these two systems are developed completely independently because each one relates to very different aircraft subsystems (landing gear and turbojet engines).

One of the main functions of the wheel braking system is to ensure a deceleration regulation ("autobrake" function) allowing the aircraft to decelerate in a uniform manner (without jolts) and adapted to the runway and to overruns ("brake to vacate" function).

FIG. 7 illustrates a classic case of a landing regulated for example to a constant deceleration level with deployment of the thrust reversers during braking.

The time when the wheels touch the ground allowing the initialization of the wheel braking algorithms is first observed in 1. In 2, once these wheel braking algorithms have been initialized and a certain wheel speed value has been reached, the deceleration regulation is activated. The wheel brakes begin their action and the aircraft is then servo-controlled to the constant deceleration setpoint. At a given time 3 not known to the wheel braking system, the thrust reversers deploy on an action of the pilot. This deployment of the thrust reversers creates a strong deceleration considered as an external disturbance by the wheel braking system which must then adapt in real time in order to reject (eliminate) this disturbance. This entire period creates a short period of time during which the deceleration is no longer equal to the setpoint and this also causes jerks in the aircraft which significantly reduces passenger comfort. In 4, once the thrust reversers have been deployed, the wheel braking regulation manages to reject the disturbance created by the deployment of the thrust reversers and again regulates the aircraft to the constant deceleration setpoint. The desired (zero or non-zero) speed is reached in 5 and the pilot deactivates the automatic deceleration function of the wheel braking system, thereby canceling the deceleration.

However, this question of comfort related to jerks that occur recurrently poses an essential problem that must be resolved, and this especially as the correctors allowing the deceleration regulation are dimensioned to the amplitude of these jerks, which causes a loss of performance of the wheel braking system. Indeed, to correctly eliminate this relatively significant disturbance (up to 50% of the deceleration), a very dynamic corrector is needed to guarantee the comfort of the rest of the braking. But, on the contrary, to filter anything that could be felt as a "jolt", a rather not very dynamic corrector is necessary. The compromise between these two constraints is therefore difficult to find and invites to find other solutions for ensuring better comfort for these passengers.

DISCLOSURE OF THE INVENTION

The present invention aims to propose an alternative solution that allows ensuring a smoother deceleration of the aircraft. One aim is to offer more degrees of freedom in the design of the wheel braking system and in particular to ease up the aforementioned corrector adjustment compromise.

These aims are achieved by a method for monitoring the braking of the wheels of an aircraft in which the braking of the wheels of the aircraft is controlled by a wheel braking controller actuating the wheel brakes of the aircraft based on both a deceleration regulation request and a thrust reverser deployment request.

Thus, by informing the wheel braking controller of the behavior of the thrust reversers, it is possible to ease up the adjustment corrector compromise necessary in the prior art.

According to the embodiment envisaged, the thrust reverser deployment request is received either directly by the wheel braking controller from a cockpit of the aircraft, or directly by the wheel braking controller and relayed to a thrust reverser controller actuating the deployment of the thrust reversers, or directly by a controller of the thrust reversers which relays it to the wheel braking controller.

Advantageously, to eliminate a disturbance created by the deployment of the thrust reversers, a deceleration regulation order issued by the wheel braking controller to the wheel brakes is kept substantially constant either by an adaptation of a deceleration setpoint in proportion to the disturbance created by the deployment of the thrust reversers or by an adaptation of a gain in a function of transfer of the wheel braking regulation loop in proportion to the disturbance created by the deployment of the thrust reversers.

The invention also relates to a wheel braking controller able to actuate brakes of the wheels of an aircraft based on a deceleration regulation request, characterized in that it is configured to actuate the brakes of the wheels of the aircraft also based on a thrust reverser deployment request.

Preferably, this controller is further configured to receive, from a thrust reverser controller, information on the actual status of the thrust reversers.

BRIEF DESCRIPTION OF THE DRAWINGS

Other characteristics and advantages of the present invention will emerge from the description given below, with reference to the appended drawings which illustrate an exemplary embodiment thereof without any limitation and on which:

FIG. 1 shows a simplified architecture of wheel braking and thrust reverser systems according to a first embodiment of the invention, FIG. 2 shows a simplified architecture of wheel braking and thrust reverser systems according to a second embodiment of the invention, FIG. 3 shows a simplified architecture of wheel braking and thrust reverser systems according to a third embodiment of the invention, FIG. 4 details the structure of the wheel braking controller of the invention, FIG. 5 illustrates the deceleration curve obtained with the wheel braking controller of FIG. 4, FIG. 6 shows wheel braking and thrust reverser systems according to a conventional simplified architecture of the prior art, and FIG. 7 illustrates the deceleration curve of the wheel braking system of FIG. 6.

DESCRIPTION OF THE EMBODIMENTS

Three embodiments of the invention illustrated successively in FIGS. 1 to 3 are envisaged to ensure this information from the wheel braking controller.

In the embodiment of FIG. 1, it is simply proposed that the thrust reverser deployment request 24 which is, in known architectures, sent from the cockpit of the aircraft 18 directly and only to the thrust reverser controller 22, is also sent in parallel to the wheel braking controller 14.

With this architecture, the deceleration profile is however not optimal because the wheel braking controller cannot control the time when the thrust reversers will deploy and therefore does not know their actual status. It can only react in relation to the deployment request made by the pilot and estimate that the deployment is actually taking place. Consequently, there is a risk of taking into account the order of deployment of the reversers while they are not deployed, causing a transient very detrimental to the braking comfort and performance (with an effective deceleration lower than the one ordered). This risk can however be eliminated by providing for the receipt of information 30 from the thrust reverser controller on this actual status of the reversers allowing it to verify that the reversers are properly deployed.

It will be noted that this architecture allows very simply, in a degraded mode in which the deployment request is not taken into account, a return to the conventional architecture where the braking of the wheels and the deployment of the thrust reversers are managed independently of each other.

In the embodiment of FIG. 2, it is proposed that controller of the thrust reversers 22 relays the thrust reverser deployment request 24 received directly from the cockpit 18 to the wheel braking controller 14.

As previously, with this architecture, the deceleration profile is not optimal either because the wheel braking controller cannot control the time when the thrust reversers will deploy and therefore does not know their actual status. It can only react in relation to the deployment request received from the thrust reverser controller and estimate that the deployment is actually taking place. Consequently, there is a risk of taking into account the order of deployment of the reversers while they are not deployed, causing a transient very detrimental to the braking comfort and performance. However, as previously, this risk can be eliminated by providing for the receipt of information 30 from the controller of the thrust reversers on this actual status of the reversers allowing it to verify that the reversers are properly deployed.

This architecture also allows very simply a return to the classic architecture where the braking of the wheels and the deployment of the thrust reversers are managed independently of each other by choosing in a degraded mode not to take into account the deployment request and the possible status of the reversers.

In the embodiment of FIG. 3, the deceleration regulation request 16 and the thrust reverser deployment request 24 are both sent to the wheel braking controller 14 which can then choose to relay the thrust reverser deployment request to the thrust reverser controller 22 for example only when it is ready to take its effect into account. Once this request has been relayed to the thrust reverser controller 22, the latter can confirm good receipt to the wheel braking controller and send back information 30 on the actual status of the thrust reversers: non-deployed, deploying, deployed reverser.

This master (for the brakes) slave (for the reversers) type operation allows optimizing the deceleration of the aircraft as much as possible because the deceleration regulation algorithm can be perfectly adapted from the actual status of the reversers. It is also possible to recreate (by an inverse model which sends back, for example, the instantaneous deceleration delta or predicted with some steps ahead of the wheel braking controller), the deceleration induced by the thrust reversers and to integrate it directly into the deceleration regulation in order to be able to easily reject the disturbance due to the deployment of the thrust reversers. This can be done in the thrust reverser controller or in the wheel braking controller subject to a model data sharing necessary for the regulation.

FIG. 4 illustrates an exemplary embodiment of the wheel braking controller 14 which issues the deceleration regulation order 20 for the wheel brakes 10 from the deceleration regulation request 16. This controller includes a corrector 32 which acts as known on a regulation deviation between a setpoint 34 and a measured value of this deceleration 21. However, this setpoint is not a nominal deceleration setpoint 36 but an adapted deceleration setpoint delivered by a setpoint adaptation module 38 which receives the thrust reverser deployment request 24 and possibly the information 30 on the actual status of these thrust reversers 12. This module 38 therefore allows switching from the nominal deceleration setpoint to the adapted deceleration setpoint. The wheel braking controller can thus directly modify its deceleration setpoint in line with the thrust reverser deployment request so that the braking effect of the reversers and the wheel braking setpoint coincide with the value requested at the cockpit of the aircraft.

The passage from the nominal deceleration setpoint to the adapted deceleration setpoint that allows guaranteeing a jolt-free deceleration regulation order 20 is illustrated in FIG. 5 which presents the ideal case in which the adapted deceleration setpoint 34 decreases instantly as soon as it is known, at a time T1, that the reversers move (thrust reverser deployment request 24 received). Then, this setpoint changes exactly opposite to the deceleration effect produced by the thrust reversers (the hatched area 40 corresponds to the compensation for the aerodynamic effect of the reversers). The objective is of course to have a constant deceleration corresponding to the value requested by the pilot. Once the deployment of the thrust reversers is completed at a time T2, the deceleration setpoint returns to the constant value of the nominal setpoint 36 so as not to accelerate too much and to have minimum oscillation during the transients.

It will be noted that there are other types of adaptation that can have the same result as the aforementioned setpoint adaptation. For example, an adaptation of the gain of the transfer function of the closed loop system is also possible. For this, the gains of the regulation loop are modified at the time of the events defined by the thrust reverser deployment request and the status of these thrust reversers.

The main advantage of this solution is therefore to obtain very smooth aircraft deceleration and therefore to increase passenger comfort during the landing phases. Thus, the transfer of data between the two controllers allows predicting the behavior of the aircraft.

Each of these three embodiments involves the increase in signals to be transmitted between the cockpit and the two controllers and therefore in particular an increase in wiring. This drawback should however be put into perspective as it depends essentially on the communication network present in the aircraft. However, with the current AFDX-type (Avionics Full DupleX) networks, the need to add wiring tends to disappear.

The invention claimed is:

1. A method for controlling the braking of wheels of an aircraft, the method comprising:
   sending a thrust reverser deployment request to a wheel braking controller;
   sending a deceleration regulation request to the wheel braking controller; and
   controlling the braking of wheels of the aircraft in response to the wheel braking controller actuating wheel brakes of the aircraft based on both the thrust reverser deployment request and the deceleration regulation request.

2. The method according to claim 1, wherein the thrust reverser deployment request is received directly by the wheel braking controller from a cockpit of the aircraft.

3. The method according to claim 2, wherein the thrust reverser deployment request received directly by the wheel braking controller is relayed to a thrust reverser controller actuating the deployment of the thrust reversers.

4. The method according to claim 1, wherein the thrust reverser deployment request is received directly by a controller of the thrust reverser which relays it to the wheel braking controller.

5. The method according to claim 1, wherein, to eliminate a disturbance created by the deployment of the thrust reversers, a deceleration regulation order issued by the wheel braking controller to the wheel brakes is kept substantially constant by an adaptation of a deceleration setpoint in proportion to the disturbance created by the deployment of the thrust reversers.

6. The method according to claim 1, wherein, to eliminate a disturbance created by the deployment of the thrust reversers, a deceleration regulation order issued by the wheel braking controller to the wheel brakes is kept substantially constant by an adaptation of a gain in a function of transfer of the wheel braking regulation loop in proportion to the disturbance created by the deployment of the thrust reversers.

7. The method according to claim 1, wherein information on the actual status of the thrust reversers is transmitted to the wheel braking controller.

8. A wheel braking controller comprising:
   a setpoint adaptation module, wherein the setpoint adaptation module receives both a deceleration regulation request and a thrust reverser deployment request; and
   a corrector, wherein the corrector cooperates with the setpoint adaptation module to brake the wheels of an aircraft by actuating wheel brakes of the aircraft based on both the deceleration request and the thrust reverser deployment request.

9. The wheel braking controller according to claim 8, wherein it is further configured to receive, from a thrust reverser controller, information on the actual status of the thrust reversers.

10. An aircraft including a wheel braking controller according to claim 8.

* * * * *